United States Patent [19]

Ein et al.

[11] Patent Number: 5,042,551
[45] Date of Patent: Aug. 27, 1991

[54] REMOVABLE WINDOW COVER SYSTEM FOR RECREATIONAL VEHICLES

[76] Inventors: Alan Ein, 9201 Gazette Ave., Chatsworth, Calif. 91311; Hartley Emerson, 1432 Pioneer Way, El Cajon, Calif. 92020

[21] Appl. No.: 583,201

[22] Filed: Sep. 17, 1990

[51] Int. Cl.$^5$ ............................................. B60J 3/00
[52] U.S. Cl. .................................. 160/90; 160/370.2; 160/402
[58] Field of Search ................. 160/370.2, 90, 91, 105, 160/327, 354, 368.1, 402; 296/97.7, 97.9, 95.1; 52/202, 222

[56] References Cited

U.S. PATENT DOCUMENTS

| | | | |
|---|---|---|---|
| 1,211,403 | 1/1917 | Burrowes | 160/327 X |
| 1,598,068 | 8/1926 | Erickson | 160/368.1 |
| 1,705,442 | 3/1929 | Dominick | 160/368.1 |
| 3,002,236 | 10/1961 | Humphner | 160/354 X |
| 3,455,366 | 7/1969 | Bogumil | 160/368.1 |
| 3,751,100 | 8/1973 | Keyes | 160/370.2 X |
| 4,182,088 | 1/1980 | Ball | 160/354 X |
| 4,560,245 | 12/1985 | Sarver | 160/370.2 X |
| 4,759,581 | 7/1988 | McNamee | 160/370.2 X |
| 4,790,591 | 12/1988 | Miller | 160/370.2 |

Primary Examiner—David M. Purol
Attorney, Agent, or Firm—Charles C. Logan, II

[57] ABSTRACT

A removable window cover system for recreational vehicles that has unique window cover clamps that are permanently secured to the inside surface of the vehicles window around its periphery. The window clamps have a horizontal base portion that has an inverted U-shaped spring portion extending upwardly from its rear edge and the spring clamp portion forms a cavity having a predetermined width. A sheet of opaque material and a sheet of partial light transmitting screen each have a shape similar to that of the window and they also have their own trim strip extending around their perimeter. These trim strips are detachably secured in the cavity of the window cover clamps. When complete privacy is desired, both sheets of material would be secured in the window cover clamps. When the occupants of the recreational vehicle desire to be able to look out through their windows while maintaining a high degree of privacy from people looking in from the outside, they merely remove the sheet of opaque material from the respective window cover clamps.

4 Claims, 1 Drawing Sheet

REMOVABLE WINDOW COVER SYSTEM FOR RECREATIONAL VEHICLES

BACKGROUND OF THE INVENTION

The invention relates to recreational vehicles and more specifically to a removable window cover system for them.

Presently owners of recreational vehicles have several different options as to coverings for their windows when they desire complete privacy. Some owners have venetian blinds covering the windows, some have curtains that cover the windows, and some owners use an opaque cover that is attached to the outside of the vehicle around the perimeter of the windows.

An improvement to the outside opaque cover for the windows of a recreational vehicle is illustrated in the U.S. Pat. No. 4,779,918 of McNamee. He utilizes a sunscreen plastic material that allows the occupants of the vehicle to clearly look outwardly through the window while restricting the ability of someone outside the vehicle looking into the interior. McNamee uses snap or touch fastener material that is attached to the outside surface of the window and also to the inner surface of the sheet of privacy sunscreen material.

It is an object of the invention to provide a novel removable window cover system for recreational vehicles that can be secured to the inside surface of the vehicle.

It is also an object of the invention to provide a novel removable window cover system for recreational vehicles that utilizes unique window cover clamps that are permanently secured to the inside surface of the window.

It is another object of the invention to provide a novel window cover system for recreational vehicles that is economical to manufacture and market.

It is an additional object of the invention to provide a novel removable window cover system for recreational vehicles that allows the owner to remove the sheet of opaque material from the window cover clamps while leaving the sheet of partial light transmitting screen secured thereto thus providing a major degree of privacy for the people in the vehicle.

SUMMARY OF THE INVENTION

Applicant's novel removable window cover system for recreational vehicles has been designed to be easily installed. The system also allows for complete privacy by securing a sheet of opaque material over the window with it secured thereto by the novel window cover clamps. An option also exists to provide the occupants of the vehicle with the ability to look outwardly through the windows when they merely have a sheet of partial light transmitting screen secured over the window. In this last instance, people trying to look in through the window have restricted visibility.

The unique window cover clamps have a horizontal base portion whose bottom surface is secured to the inner surface of the vehicle window by a conventional type of adhesive. Extending outwardly from the rear edge of these window cover clamps and integrally formed therewith is an inverted U-shaped spring clamp portion that forms a cavity. The respective sheets of opaque material and sheet of partial light transmitting screen each have a trim strip around their perimeter and the combined thickness of the two trim strips when placed adjacent each other is less than the diameter of the opening of the cavity so they can be easily detachably secured therein. A toe portion on the front leg of the inverted U-shape spring clamp portion flares outwardly from the horizontal base portion in order to help guide the two trim strips into the cavity area. The material of the window cover clamps needs to be slightly resilient and is preferably formed of a plastic material or a spring metal material.

DESCRIPTION OF THE PREFERRED EMBODIMENT

Figure 1:
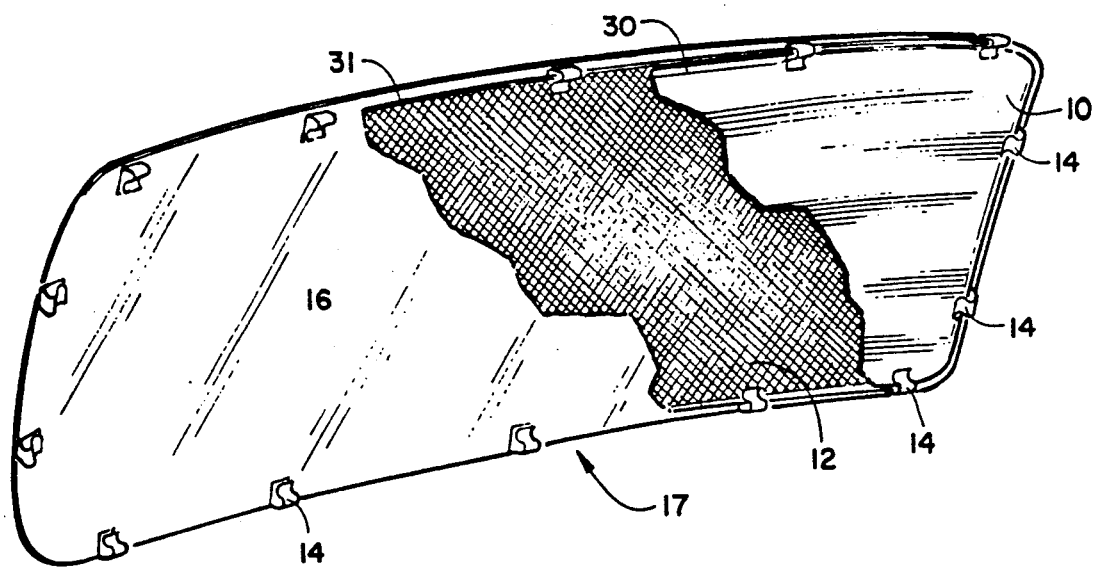
FIG. 1 is a front elevation view of the inside surface of a recreational vehicle window.
Figure 2:
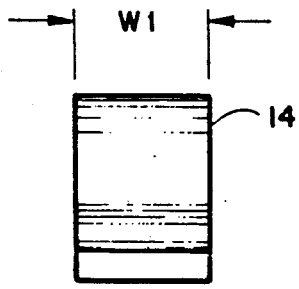
FIG. 2 is a front elevation view of the unique window cover clamp.
Figure 3:
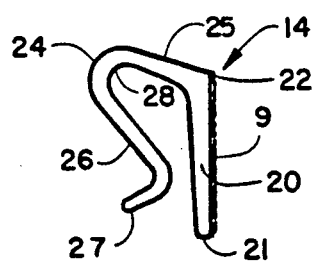
FIG. 3 is side elevation view of the unique window cover clamp.

Applicant's novel removable window cover system for recreational vehicles will now be described by referring to FIGS. 1-5 of the drawing. The major components of the system are: a sheet 10 of opaque material, a sheet 12 of partial light transmitting screen, and a plurality of window cover clamps 14.

The window cover clamps 14 are secured by an adhesive 9 to the inside surface 16 of window 17. The window clamps have a horizontal base portion 20 having a front edge 21 and rear edge 22. The top surface of horizontal base portion 20 has its front edge tapered. An inverted U-shaped spring clamp portion 24 has a rear leg 25 and a front leg 26. Rear leg 25 is connected the rear edge 22 of horizontal base portion 20 and it extends outwardly therefrom at an obtuse angle of approximately 103 degrees. A toe portion 27 extends outwardly and upwardly from front leg 26 so that it makes an acute angle of approximately 70 degrees with horizontal base portion 20.

The inverted U-shaped spring clamp portion 24 has a cavity 28 in its interior that receives the respective trim strips 30 and 31 of the sheets of opaque material 10 and partial light transmitting screen 12. Their thicknesses respectively are T1 and T2 and the width of cavity 28 is greater than their combined thickness.

Figure 5:
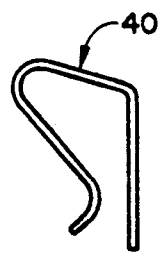
FIG. 5 is side elevational view of an embodiment of the window cover clamp made of metal material.
Figure 4:
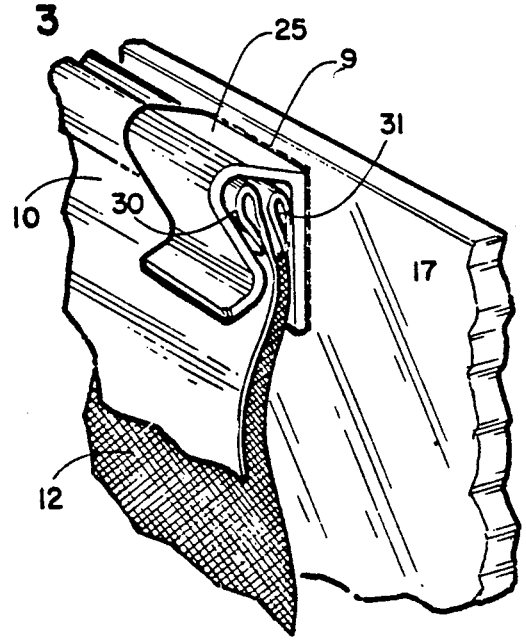
FIG. 4 is a partial front perspective view illustrating the window cover clamp secured to the inner surface of the window of the recreational vehicle and also having the combined sheets of opaque material and partial light transmitting screen detachably secured in the window cover clamp.

Window cover clamp 14 is preferably made of plastic material having a slight resiliency thereto. In FIG. 5 the window cover clamp 40 is formed of a spring steel and it has a uniform thickness.

What is claimed is:

1. A removable privacy and sunshade cover system for the window of a recreational vehicle comprising:
   at least one 4-sided vehicle window having an inside surface, a top edge, a bottom edge, and a pair of laterally spaced side edges;
   a sheet of opaque material having a shape similar to the shape of said window and having a trim strip extending around its perimeter having a thickness T1;

a sheet of partial light transmitting screen having a shape similar to the shape of said window and having a trim strip extending around its perimeter having a thickness T2;

a plurality of window cover clamps each having a horizontal base portion; each horizontal base portion having a top surface, a bottom surface, a front edge and a rear edge; a spring clamp portion extending upwardly from the front edge of said horizontal base portion and it has an inverted U-shape that forms an interior cavity for detachably receiving the trim strip of the respective sheet of opaque material and the sheet of partial light transmitting screen; said inverted U-shape spring clamp portions each have a front leg and a rear leg, said rear leg extends upwardly from the rear edge of said horizontal base portion at an obtuse angle of at least 103 degrees; the interior cavity of said inverted U-shaped spring clamp portion has a width greater than than T1+T2, the thickness of said respective trim strips; the front leg of said inverted U-shaped spring clamp portion has a toe portion positioned over the top surface of the horizontal base portion of the window cover clamp and it extends away therefrom at an acute angle of at least 70 degrees;

means for rigidly securing the bottom surfaces of a plurality of said window clamps to the inside surface of said window at predetermined positions around the perimeter of the window; and said sheet of opaque material positioned over top of said sheet of partial light transmitting screen and their trim strips being detachably captured in the spring clamp portions of said window cover clamps.

2. A removable privacy and sunshade cover system as recited in claim 1 wherein the horizontal base portions of said window cover clamps have a front edge whose height is tapered.

3. A removable privacy and sunshade cover system as recited in claim 1 wherein said window cover clamps are made of plastic material.

4. A removable privacy and sunshade cover system as recited in claim 1 wherein said window cover clamps are made of spring sheet material.

* * * * *